Jan. 6, 1953 — G. A. LYON — 2,624,639
WHEEL COVER
Filed Dec. 12, 1947 — 2 SHEETS—SHEET 1
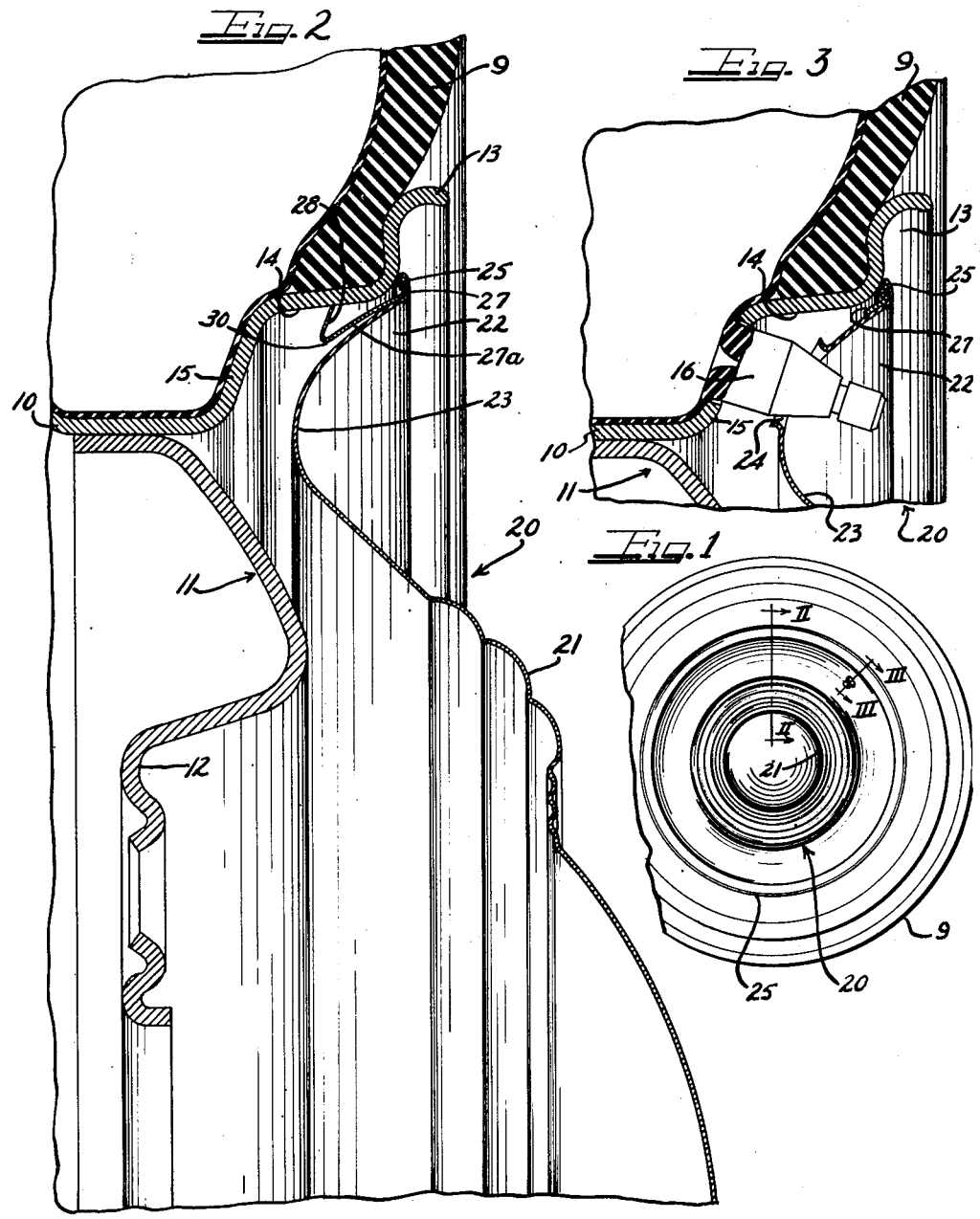
Inventor
GEORGE ALBERT LYON
by The Firm of Charles W. Hills
Attys.

Jan. 6, 1953     G. A. LYON     2,624,639
WHEEL COVER
Filed Dec. 12, 1947     2 SHEETS—SHEET 2
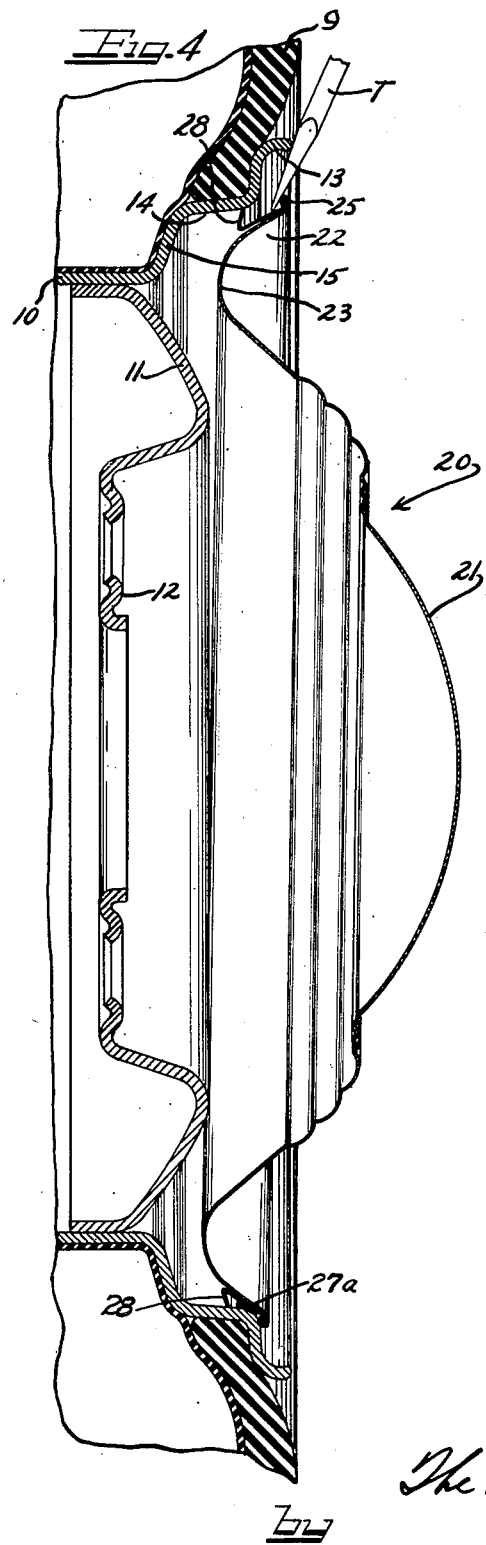
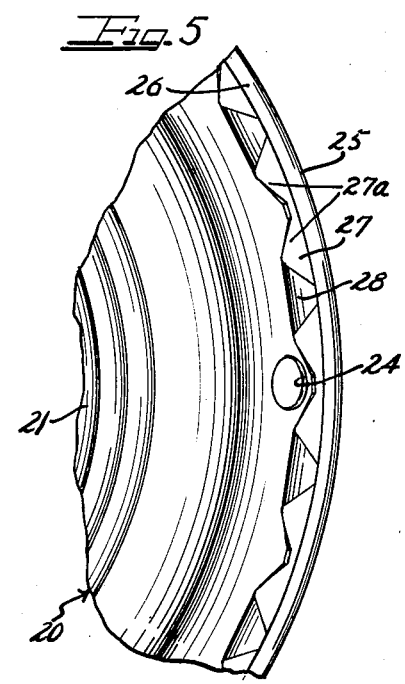
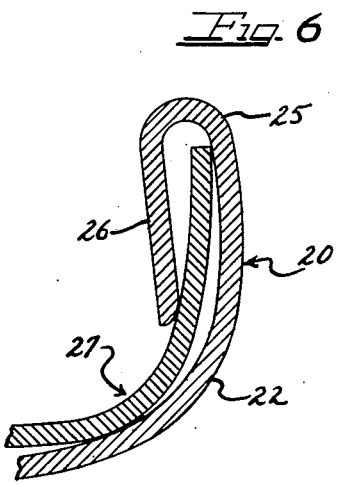
Inventor
GEORGE ALBERT LYON
The Firm of Charles W. Hills
Attys.

Patented Jan. 6, 1953

2,624,639

UNITED STATES PATENT OFFICE 2,624,639

WHEEL COVER

George Albert Lyon, Detroit, Mich.

Application December 12, 1947, Serial No. 791,305

7 Claims. (Cl. 301—37)

This invention relates to an ornamental trim for wheels and more particularly to a cover for a conventional drop center flanged tire rim type of automobile wheel.

An object of this invention is to provide a simple two-part ornamental trim for an automobile wheel in which one of the parts includes improved retaining means for engaging the wheel.

Another object of the invention is to provide retaining means for a wheel cover which will more readily yield upon the application of a pry off force to the cover for the purpose of ejecting it from the wheel.

Yet another object of this invention is to provice a wheel cover which lends itself to economical manufacture on a large production basis.

In accordance with the general features of this invention there is provided in a wheel structure including a wheel having a multi-flanged tire rim part and a body part connected thereto, a metallic trim for the wheel comprising a circular member extending over the flanges of the rim part as well as the junction of the wheel parts and retaining means on the rear side of the cover opposite the tire rim part and concealed by the circular member including a plurality of radially outwardly inclined retaining fingers connected to an outer portion of the circular member by a bent portion spaced from the circular member to provide clearance for the fingers to yield radially inwardly toward the circular member in the prying of the circular member off the wheel.

Another feature of the invention relates to the manner in which the retaining means is interlocked with the trim or cover member proper so as to provide a firm attachment of the retaining means to the member, but still permit of flexing of the retaining means in the prying of the trim member from the wheel.

Other objects and features of this invention will more fully appear from the following detailed description taken in connection with the accompanying drawings which illustrate a single embodiment thereof and in which:

Figure 1 is a fragmentary side view of a wheel structure having a cover embodying the features of this invention;

Figure 2 is an enlarged fragmentary cross-sectional view taken on substantially the line II—II of Figure 1, looking in the direction indicated by the arrows;

Figure 3 is an enlarged fragmentary cross-sectional view taken on substantially the line III—III of Figure 1, looking in the direction indicated by the arrows, and showing the valve stem projecting through the cover member;

Figure 4 is an enlarged fragmentary cross-sectional view similar to Figure 2, showing the manner in which the cover may be pried off of the wheel by a pry-off tool;

Figure 5 is a fragmentary rear view of a portion of the outer margin of the cover, showing the retaining fingers and the relation of the same to the outer edge of the cover and the valve stem; and Figure 6 is an enlarged fragmentary cross-sectional view through a portion of the outer edge of the cover, showing the manner in which the retaining means is interlocked with the cover proper.

As shown on the drawings:

The reference character 9 designates generally a conventional pneumatic tire and tube assembly mounted in the usual multi-flanged and shouldered drop center type of tire rim 10 which is carried in turn by a wheel body part 11. This part 11, as is the standard practice, comprises a dished stamping including a central wheel bolt-on flange 12 for attaching the wheel in the usual way to a part on an axle.

The flanged tire rim 10 includes on the outer side of the wheel an outer curved flange 13, an intermediate flange 14 and a flange 15 terminating in the base of the rim part. The flange 15 (Figure 3) has extending through it the usual valve stem 16 of the tube and tire assembly 9 and this stem is adapted to extend through a hole in the cover, to be hereinafter described.

Cooperable with this conventional wheel assembly is an ornamental metal circular cover 20, embracing the features of this invention. This cover has a central crowned portion 21, which may be formed integral with the cover, as shown, or may be made as a separate part, if desired, connected to the cover. In addition, the cover includes an outer annular portion 22 which diverges from the central portion of the cover and is connected to the central portion of the cover by an intermediate curved portion 23 adjacent the junction of the two wheel parts 10 and 11.

It will be noted from Figure 3 that the portion 22 of the cover has an aperture 24 through which the valve stem 16 projects and which permits of the cover extending in close to the flange 15. This hole 24, as shown in Figure 4, is disposed between a pair of cover retaining fingers 28 to be hereinafter described.

Referring now to Figure 6, it will be noted that the convex-concave curved outer cover portion 22 terminates in a generally radially outwardly extending angular margin affording a generally L-shape cross-section and finished at the periphery of the cover by a reinforcing bead-like rounded outer edge 25. From the outer edge 25 extends generally radially inwardly behind the outer margin an underturned flange portion 26 for lapping and fastening the generally radially outwardly extending outer marginal flange of a cover retaining ring 27 of generally L-shape outer marginal cross-section, substantially complementary to and internested within the angle defined by the outer margin of the cover. This retaining ring 27 is concealed by the cover and extends generally radially and axially inwardly behind the angular margin of the portion 22 and is provided with a series of generally radially and axially inwardly directed retaining finger extensions 27a each of which terminates in a generally radially and axially outwardly inclined gripping finger 28.

Each of the retaining fingers includes a base portion comprising an integral extension of the inner portion of the ring 27, as best seen in Fig. 5, and separated from adjacent finger bases by a substantially notched out arrangement of the ring between fingers to afford a substantially resilient backing for the finger. In the preferred form shown, the opposite sides of the respective finger bases and the gripping fingers 28 flare divergently at the same angle and the root width of the cut-outs or wedge shaped notches between fingers is substantially the same as the width of the gripping edges or tips of the finger terminals. Considered another way, the width of the finger extensions 27a between the roots of the notches at the opposite sides, at juncture thereof with the body of the ring, is several times as great as the width of the finger tips. It will thus be apparent that the flared fingers 28 are of progressively greater resilience from the tips to the juncture with the flaring base portions of the extensions 27a.

Since the finger base portions flare to a substantially greater width than the fingers 28 at juncture with the base portions, in the present instance to twice the width, the resiliency of the base portions is quite substantial. This resilience is enhanced by the curvature of the base portions following the curvature of the ring 27. The overall resilience of the fingers is also enhanced by the rib-like, and thus stiff, rounded juncture of the fingers 28 and the bases 27a.

The extremities or tips of the fingers 28 are disposed normally in a circle of a diameter slightly greater than that of the radially inner surface of the tire rim flange 14 so that when the cover is pushed axially home on the wheel the fingers will grip the tire rim surface under tension to hold the cover on the wheel.

As best shown in Figure 6, the retaining ring 27 is locked against axial displacement by the underturned cover portion 26 and the opposing cooperating radially extending marginal portion of the cover. By reason of the internested L-shape formation of the parts, the ring 27 bears at its intermediate angular shoulder radially inwardly against the cover at the area to which the arrow of numeral 27 points and within the re-entrant angle of the corner of the angular cover margin. At its outer edge the ring 27 is opposed by the inside of the turned edge 25 of the cover. Thereby the ring 27 is held against radial escape or displacement.

From the radially inner shouldering engagement of the retaining ring 27 against the inner side of the cover, the generally axially extending, annularly continuous portion of substantial width of the ring and the finger extensions 27a extend radially and axially inwardly, preferably frusto-conically and normally diverge from the inwardly convex cover portion 22.

When the cover is pressed axially inwardly onto the wheel, the fingers 28 are cammed inwardly along the inner face of the rim flange 14, thus placing the fingers 28 and finger extensions 27a under radially inward tension and moving the backs of the extensions toward the opposing cover portion 22. When the cover has been pressed fully home onto the wheel the portions of the ring comprising the finger extensions 27a may, due to the substantial inward stressing thereof, make contact with the cover portion 22 axially inwardly adjacent to the normal contact of the intermediate shoulder of the ring against the cover, as best seen on comparison of Figures 2 and 6. This contact may be progressive by increments from the shoulder axially inwardly, to the extent that any given finger is impressed radially inwardly as a result of its tensioning on the wheel. This supplements the backing up of the stressed fingers and enhances the resilient tension reaction of the fingers. As a result the retaining fingers are held under great retaining pressure against the rim flange surface 14.

Attention is directed to Figure 2 wherein it will be perceived that the radially inner portion of the ring 27 is spaced a substantial distance from the inner surface of the cover portion 22 to provide clearance at 30 for the inward flexing of the fingers 28 in prying the cover from the wheel. If these fingers tightly abutted the cover portion throughout the length of the backs or extensions 27a there would be no clearance for them to move and as a result it would be very difficult to pry off the cover.

It is clear that by reason of the multiple thickness of metals at the outer margin of the cover and the reinforcing effect of the turned outer edge 25 of the cover a rigidified pry-off edge is provided on the cover. This edge is adapted to be engaged by a pry-off tool T, as shown in Figure 4, for the purpose of positively forcing the cover off the wheel. In actual practice, the end of a screw-driver or the like is inserted behind the edge 25 and is pressed against the outer edge of the rim so that the tool will act as a lever in disengaging the spring fingers 28 from their retaining engagement of flange 14.

The fingers can be progressively released by moving the tool along the edge 25 until enough of them have been disengaged to permit the cover 20 to drop out of the wheel. During the application of the pry-off force, there is not only an axially outward component of force but also a radially inward component of force. Since the retaining fingers are resiliently radially flexible they can yield resiliently at the opposite side of the cover from the application of pry-off force to the limit of the gap 30 or until substantially full contact of the finger extensions 27a with the cover portion 22 as illustrated in the lower portion of Figure 4.

In applying the cover to the wheel, the hole 24 is first aligned with the valve stem 16 and then the cover is pressed axially inwardly toward the wheel until the outer edge 25 bottoms on the junction of tire rim flanges 13 and 14, as shown in Figure 2. In the course of this operation the extremities of the fingers 28 slide along the surface of flange 14 until the cover is against the wheel at which time the fingers under tension tightly grip the surface of flange 14. In addition, due to the angle or inclination of these fingers their gripping engagement will be enhanced by any force tending to accidentally displace the cover.

The main part of the cover 20 may comprise a metallic stamping and the retaining ring 27 may comprise a rolled section. Moreover, in the event that the ends of the rolled ring 27 are not welded together the outer turned edge 25 of the cover as well as the radially inner shouldering of the ring against the cover portion 22 will hold the ring in a substantially true annular shape. At least this holding of the ring will suffice to maintain the extremities of the fingers 28 in a generally true circle.

I claim as my invention:

1. As an article of manufacture, a circular sheet metal wheel cover having a dished radially outer portion terminating in an under-turned peripheral edge and retaining means for detachably fastening the cover to the wheel, comprising a circular ring behind the dished cover portion with an outer peripheral edge interlocked to the cover by said cover underturned edge and bearing on and being backed up by the dished portion adjacent said interlocked edges, said ring being inclined axially and radially inwardly from said backing and having as continuation of its inner peripheral margin a plurality of circumferentially spaced resiliently flexible retaining finger extensions, said finger extensions terminating in an angular extremity inclined generally radially outwardly divergently relative to the finger extensions for resiliently tensioned retaining gripping engagement at their tips with a wheel flange, said angular fingers being resiliently deflectable relative to said backing to bring the finger extension portions of the ring into engagement with the back of the dished portion adjacent to juncture of the extensions with the ring to back-up the resilient gripping engagement of the wheel flange by the fingers.

2. In a wheel structure including a multi-flanged tire rim having an intermediate flange and a terminal flange at the outer side of the wheel, a circular wheel cover for substantially concealing the tire rim including said intermediate flange and at least the adjacent portion of the terminal flange, and a cover retaining ring having a radially outer marginal portion secured to the radially outer marginal portion of the wheel cover, said ring having a frusto-conically radially and axially inwardly extending portion behind the cover and provided with retaining finger extensions projecting as continuations of the frusto-conical shape from the inner edge of the frusto-conical ring portion, said extensions having divergently generally radially and axially outwardly extending terminals retainingly engaging said intermediate flange under radially inward tension acting to tension the extensions radially inwardly, said cover having a portion thereof engaged by the extensions adjacent to juncture thereof with the ring to enhance the tension of the extensions, the cover and said extensions inwardly from said tension enhancing engagement thereof being in clearance relation to afford a gap for inward flexing of the fingers for pry-off.

3. In a cover for disposition at the outer side of a vehicle wheel having a tire rim including a generally radially inwardly facing annular flange, a circular wheel cover body having at the inner side of its outer margin a generally L-shaped re-entrant angle, a retaining structure of inherently flexible material having a generally L-shaped margin substantially complementary to said L-shaped cover body margin and operatively mounted within the re-entrant angle, the cover body margin having an underturned extremity opposing the extremity of the retaining structure margin against radially outward escape, said retaining structure margin having an angular shoulder at the juncture of the parts of the L-shape thereof shouldering against the cover body within said re-entrant angle and thereby retaining the retaining structure against radially inward displacement relative to the cover body, said retaining structure providing retaining finger extensions for retaining engagement with the tire rim flange when the cover is applied to a wheel.

4. In a cover for disposition at the outer side of a vehicle wheel, a circular wheel body having behind the outer margin thereof a retaining flange structure including a radially inwardly directed portion and a generally axially inwardly extending angularly related portion, said axially directed portion having a series of generally axially inwardly directed finger extensions of uniform tapered shape from juncture with the flange to the tip of the extension, the tip of each of the extensions being substantially the same width as the width at the root of the space between fingers at juncture of the fingers with the axially directed portion, the terminal portions of the extensions being turned radially and axially outwardly divergently to the body portions of the extensions and joined to the body portions on a rigidifying juncture rib, the base portions of the extensions being curved to follow the curvature of said axially extending portion, the juncture of said terminal portions with the extensions being at least twice as wide as said tips and the base portions of the extensions where they join the axially extending portion being approximately twice as wide as said terminal portion junctures with the extensions.

5. In a cover structure for a wheel including flanged tire rim and body parts, a resilient snap on and off circular cover member having a rearwardly turned outer peripheral edge and having extending rearwardly and radially inward from said edge a continuous annular flange spaced in close relation to the rear side of said member, said flange being resiliently connected to said turned edge so as to be bodily movable toward and away from said rear side and terminating in cover retaining finger means projecting therefrom, said means being turned radially and outwardly in an inclined plane forming a relatively short leg at an acute angle to the flange proper for gripping engagement with one of said wheel parts, the turned flange means being notched transversely of its width providing separated wheel gripping finger extremities in said plane which are movable bodily with the flange proper in the application and removal of the cover member.

6. A circular wheel cover having a radial outer peripheral turned margin provided with an axially disposed cover retaining flange structure including a continuous flange portion formed to fit over a part of the wheel rim, said flange portion being formed at spaced intervals with generally radially resiliently yieldable finger extension portions each provided with lateral side edges tapering towards the side edges of the adjoining finger portions of said flange portion adjacent the outer peripheral margin of the cover, each of said finger portions terminating in a turned gripping extremity backed up by the tension of said finger portion when it is resiliently stressed against and in gripping engagement with a wheel rim flange.

7. A circular wheel cover made from a sheet of metal having a radially outer turned peripheral margin provided with an axially extending flange formed into rearwardly extending integral spaced retaining fingers each including a generally axial leg resiliently yieldable in a radial direction and arcuately curved in the direction of the circumference of the cover and terminating in a radially and axially outwardly extending leg which is relatively short with respect to said axial leg and having an edge for sliding retaining contact with a wheel surface inclined away from the fingers, said axial leg being yieldable in response to pressure against the edge of said short leg in the application and removal of said cover.

GEORGE ALBERT LYON.

REFERENCES CITED

The following references are of record in the file of this patent:

UNITED STATES PATENTS

| Number | Name | Date |
|---|---|---|
| Re. 19,467 | Lyon | Feb. 12, 1935 |
| 2,368,228 | Lyon | Jan. 30, 1945 |